United States Patent

[11] 3,619,296

[72] Inventors Leonard W. Niedrach;
George J. Haworth, both of Schenectady, N.Y.
[21] Appl. No. 699,004
[22] Filed Dec. 26, 1967
[45] Patented Nov. 9, 1971
[73] Assignee General Electric Company

[54] FUEL CELL ELECTRODE
6 Claims, 4 Drawing Figs.
[52] U.S. Cl. .................................................. 136/86 D, 136/120 FC
[51] Int. Cl. ................................................. H01m 27/04, H01m 13/00
[50] Field of Search ......................................... 136/120 FC, 86

[56] References Cited
UNITED STATES PATENTS
3,248,267   4/1966   Langer et al. ............... 136/120 X
FOREIGN PATENTS
1,477,235   3/1967   France ........................ 136/120

Primary Examiner—Winston A. Douglas
Assistant Examiner—M. J. Andrews
Attorneys—Richard R. Brainard, Paul A. Frank, Charles T. Watts, Paul P. Webb, II, Frank L. Neuhauser and Oscar B. Waddell ABSTRACT: A fuel cell electrode is composed of catalytic and gas adsorbing materials which consist of a chromium-tungsten oxide as a support, a metal dispersed on the support, the metal selected from the class consisting of noble metals and alloys of noble metals, a current collector, and a binder bonding the materials together and to the current collector in electronically conductive relationship. Further, the catalytic and gas adsorbing materials comprise a chromium-tungsten oxide as a support, a support of carbon with boron dissolved therein, a mixture of carbon with boron dissolved therein and boron carbide, or carbon, and a metal dispersed on both of the supports, the metal selected from the class consisting of noble metals and alloys of noble metals. An adhesive binder is employed which is not chemically attacked by the electrolyte or the reactant fluid of the cell in which the electrode is used. Such an electrode is particularly useful in a fuel cell employing a fuel containing carbon monoxide, such as reformer gas, an acid electrolyte, and under various operating conditions.

Inventors:
Leonard W. Niedrach;
George J. Haworth,
by Paul R. Webb, II
Their Attorney.

Inventors:
Leonard W. Niedrach;
George J. Haworth,
by Paul R. Webb, II
Their Attorney.

3,619,296

FUEL CELL ELECTRODE

This invention relates to fuel cell electrodes and, more particularly, to fuel cell electrodes comprising catalytic and gas adsorbing materials which consist of a chromium-tungsten oxide as a support, a metal dispersed on the support, and the metal selected from the class consisting of noble metals and alloys of noble metals bonded together and bonded to a current collector in electronically conductive relationship by a binder. Additionally, the invention includes such fuel cell electrodes wherein a second support of carbon with boron dissolved therein, a mixture of carbon with boron dissolved therein and boron carbide, or carbon is employed and the above types of metal are dispersed on both of the supports. In this application, the term "carbon and boron" will be used to describe together both of the above support materials of carbon with boron dissolved therein, and carbon with boron dissolved therein and boron carbide. When only one of the support materials is discussed, its specific name will be employed.

As it is well known, fuel cells are devices capable of generating electricity by electrochemically combining an oxidizable reactant, termed a fuel, and a reducible reactant, termed an oxidant. The reactants are fluids, either liquids or gases, and usually fed continuously to the cell from separate eternal sources. The fuel cell itself is comprised of spaced electrodes ionically connected by an electrolyte. It is a characteristic of fuel cells that the electrodes and electrolyte remain substantially chemically invariant in use.

Each electrode is electronically conductive, adsorbs the fuel or oxidant employed, presents an active material for the electrode reaction, and does not oxidize unduly under the operating conditions of the cell. When fuel and oxidant are concurrently and separately supplied to the different electrodes of the cell, an electrical potential will develop across the electrodes. When an electrical load is provided across the electrodes, an electrical current flows therebetween, the electrical energy thus represented being generated by the electrocatalytic oxidation of fuel at one electrode and the simultaneous electrocatalytic reduction of oxidant at the other. Suitable noble metals for catalysts are well known and many are described for example in "Catalysts, Inorganic and Organic," Berkman, Morrel and Egloff, Reinhold Publishing Company, Inc., New York (1940;"Catalytic Chemistry," H. W. Lohse, Chemical Publishing Company, Inc., New York (1945); etc. Suitable noble metals include the noble metals of Group VIII series of metals of the Periodic Table of Elements, which are rhodium, ruthenium, palladium, osmium, iridium, and platinum, and noble metal alloys from this group.

Since the adsorption of gases on solids is a surface phenomena, it is desirable that the electrodes be of the maximum practicable surface area and that the surface of the catalyst material preferably be in its most active state for the adsorption of gases. Thus, the extent and character of the surface presented by such catalytic material in a fuel cell electrode is an important factor in the securing of superior electrode performance. It is, of course, possible to insure an extensive catalytically active surface in a fuel cell electrode by utilizing large quantities of catalytically active material. However, the most highly catalytically active materials are expensive, accordingly, these catalytic materials should be utilized in as efficient manner as possible. The most efficient utilization of catalyst is achieved by distributing the catalytic materials so that the greatest amount of surface area may be secured per unit weight of the catalyst material.

In a copending patent application entitled "Fuel Cell Electrode" of Leonard W. Niedrach, filed concurrently herewith, there is disclosed and claimed a fuel cell electrode comprising a mixture of catalytic and gas adsorbing materials of a chromium-tungsten oxide and a metal selected from the class consisting of noble metals and alloys of noble metals bonded together and bonded to a current collector in electronically conductive relationship by a binder.

In a copending patent application entitled "Fuel Cell Electrode" of Leonard W. Niedrach and Willard T. Grubb, filed concurrently herewith, there is disclosed and claimed a fuel cell electrode comprising a mixture of catalytic and gas adsorbing materials which consist of a chromium-tungsten oxide and a metal dispersed on a support, the metal selected from the class consisting of noble metals and alloys of noble metals bonded together and bonded to a current collector in electronically conductive relationship by a binder. Both of these copending applications are assigned to the same assignee as the present application.

Our present invention is directed to a fuel cell electrode which comprises catalytic and gas adsorbing materials of a chromium-tungsten oxide as a support, a metal dispersed on the support, and the metal selected from the class consisting of noble metals and alloys of noble metals bonded together and bonded to a current collector in electronically conductive relationship by a binder. Further, the catalytic and gas adsorbing materials comprise a chromium-tungsten oxide as a support, a support of carbon and boron or carbon, and a metal dispersed on both of the supports, the metal selected from the class consisting of noble metals and alloys of noble metals. Such an electrode is particularly useful in fuel cells employing a fuel containing carbon monoxide, such as reformer gas, and acid electrolyte, and under various operating conditions.

It is a primary object of our invention to provide an improved electrode with a low loading of a noble metal catalyst which is tolerant to carbon monoxide and maintains the required catalytic characteristics.

It is another object of our invention to provide such an electrode incorporating at least one support material thereby securing efficient utilization of the catalyst.

It is a further object of our invention to provide a fuel cell which employs such an electrode as the anode therein and which operates on a fuel containing carbon monoxide.

In accordance with our invention, an electrode comprises catalytic and gas adsorbing materials which consist of a chromium-tungsten oxide as a support, a metal dispersed on the support, the metal selected from the class consisting of noble metals and alloys of noble metals, with a current collector, and a binder bonding the material together and to the current collector in electronically conductive relationship. Additionally, our invention includes such electrodes wherein a second support of carbon and boron or carbon is employed and the above types of metal are dispersed on both of the supports.

These and various other objects, features and advantages of the invention will be better understood from the following description taken in connection with the accompanying drawing in which.

Figure 1:
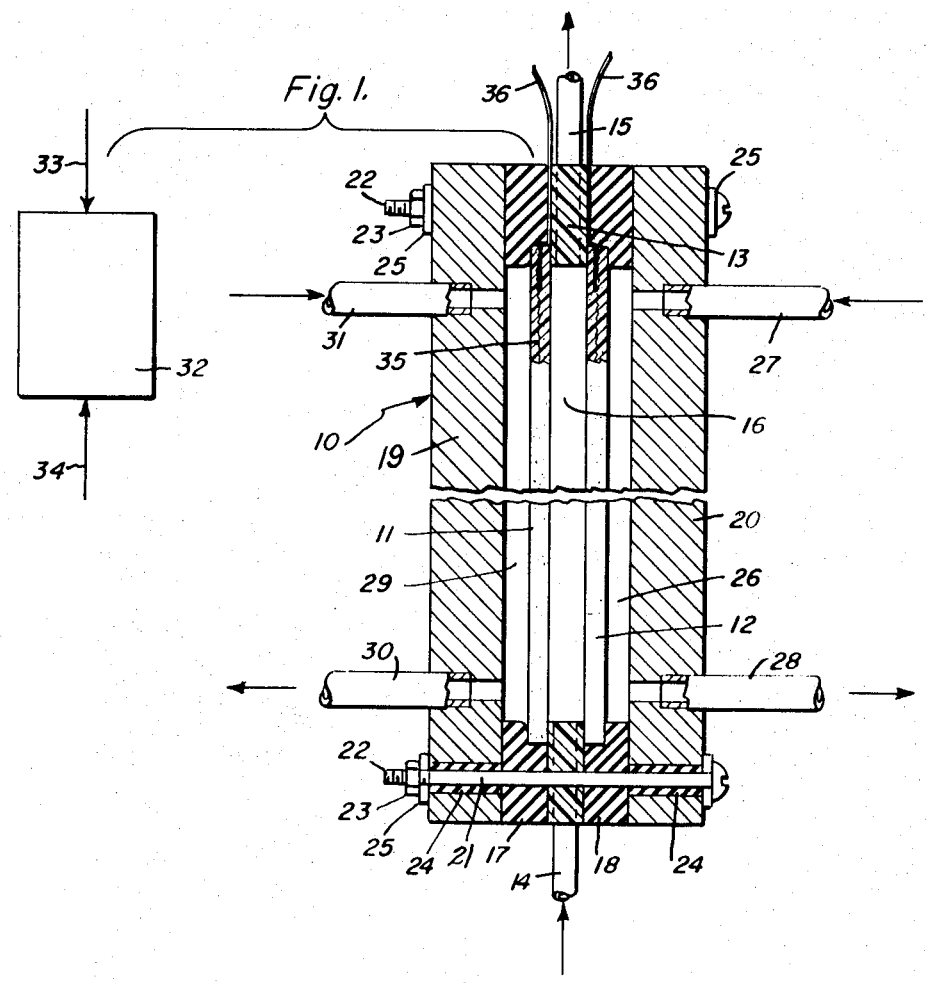
FIG. 1 is a sectional view of a fuel cell made in accordance with our invention.

In FIG. 1 of the drawing, there is shown generally at 10 a fuel cell embodying our invention which comprises a preferred anode 11 and a cathode 12, separated by an annular electrolyte gasket 13. Electrolyte inlet conduit 14 and electrolyte outlet conduit 15 are sealingly related to the electrolyte gasket to circulate a free aqueous electrolyte to and from electrolyte chamber 16 formed by the anode, cathode and gasket. An anode gasket 17 and a cathode gasket 18 are positioned adjacent opposite faces of the electrolyte gasket to seal therewith and to hold the anode and cathode in assembled relation. Identical end plates 19 and 20 are associated with the anode and cathode gaskets, respectively, in sealing relation therewith. To hold the gaskets and end plates in assembled relation, a plurality of tie bolts 21 are provided, each having a threaded end 22 and a nut 23 mounted thereon. To insure against any possibility of internal short circuiting of the fuel cell electrodes, the tie bolts are provided with insulative bushings 24 within each end plate and with an insulative washer 25 adjacent each terminus.

An oxidant chamber 26 is formed by the cathode gasket, cathode, and end plate 20. An oxidant inlet conduit 27 is sealingly associated with the end plate to allow oxidant to be fed to the oxidant chamber while an oxidant outlet conduit 28 is similarly associated with the end plate to allow the purge of oxidant. Where the fuel cell is to be operated on ambient air, no end plate 20 is required. The anode, anode gasket, and end plate 19 similarly cooperate to form a fuel chamber 29. A fuel outlet conduit 30, similar to oxidant outlet conduit 28, is provided. A fuel inlet conduit 31 is shown for providing a fuel to the fuel chamber from a fuel source 32, schematically shown. Where the fuel source is a synthetic reformer gas, a hydrocarbon or oxidized derivatives thereof would be supplied to source 32, as indicated by flow arrow 33, while water would be supplied to source 32, as indicated by flow arrow 34.

Figure 2:
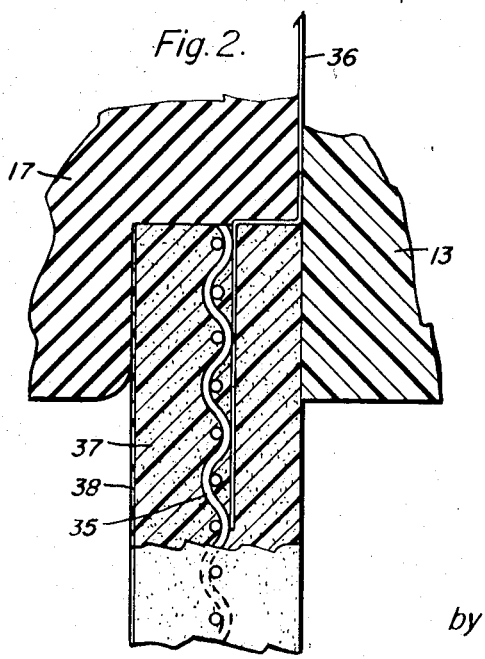
FIG. 2 is an enlarged sectional view of a fuel cell electrode made in accordance with our invention.

In FIG. 2 of the drawing there is shown generally a preferred fuel cell electrode anode 11 embodying our invention which has a current collector 35 in the form of a metal wire screen which serves the functions of transmitting electrical current and providing reinforcement for the electrode. An electrical connection in the form of an electrical lead 36 is connected directly to screen 35. Lead 36 passes to the outside of fuel cell 10 as shown in FIG. 1 at the interface of gasket 17 and gasket 13, which elements form part of the fuel cell housing. Electrode 11 has catalytic and gas adsorbing materials 37 which consist of chromium-tungsten oxide as a support, and a metal dispersed on the support, or which consist of a chromium-tungsten oxide as a support, a support of carbon and boron or carbon, and a metal dispersed on both supports, the metal selected from the class consisting of noble metals and alloys of noble metals bonded together by a binder and bonded to the current collector in electronically conductive relationship. For example, platinum is dispersed on a chromium-tungsten oxide support or is dispersed on both a chromium-tungsten oxide support and a support of carbon and boron or carbon, preferably in its graphitic state, which materials are held together and bonded to screen 35 by a binder material of polytetrafluoroethylene. This mixture 37 surrounds both the screen 35 and a portion of electrical lead 36. If desired, a hydrophobic film 38 is shown bonded to one surface of mixture 37 to prevent electrolyte flow through electrode 11. This film is desirable if the electrode is to be used with a free aqueous electrolyte.

The preferred electrolyte for use in a fuel cell employing the above electrode is sulfuric acid, $H_2SO_4$. Additionally, other acid electrolytes may be employed which are suitable for fuel cell operation. Such acid electrolytes include, for example, $H_3PO_4$, $HClO_4$, aryl and alkyl sulfonic acids, etc. The above electrode may be used in combination with an ion exchange membrane, a porous matrix for immobilizing an aqueous electrolyte, or a free aqueous electrolyte.

As it is well known, fuel cells, which operate on hydrogen, generally produce markedly reduced electrical output when the fuel is contaminated with carbon monoxide. The reason for such decreased performance has been recognized as attributable to carbon monoxide poisoning of the electrocatalyst incorporated in the anode. Where the fuel contains a substantial carbon monoxide content it has been common practice to protect the fuel cell against electrocatalyst poisoning by removing carbon monoxide before delivery to the fuel cell. In the case of reformer gas, for example, which is a mixture of hydrogen, carbon dioxide, water vapor, carbon monoxide, and hydrocarbons, usually present quantitatively in that order, the carbon monoxide can be removed either by conversion to carbon dioxide or methane before the gas is supplied to the fuel cell.

Alternately, the hydrogen can be purified by passage through a silver-palladium membrane. Thus, while platinoid metals have been frequently categorically designated as fuel electrocatalysts, it is apparent that use has been generally restricted to the electrocatalysis of reactants free from carbon monoxide contamination.

We discovered unexpectedly that the electrode of our invention, which has a low loading of a noble metal dispersed on a support of chromium-tungsten oxide, or dispersed on both supports of a chromium-tungsten oxide and carbon and boron or carbon, operates effectively as an anode in a fuel cell employing a fuel of carbon monoxide or a fuel containing carbon monoxide, such as synthetic reformer gas. Thus, the combination of the chromium-tungsten oxide support or the chromium-tungsten oxide support and carbon and boron or carbon support with a noble metal or an alloy of a noble metal dispersed thereon in our electrode makes the electrode carbon monoxide tolerant and in fact promotes the oxidation of the fuel. Of a wide variety of noble metals, which were discussed above, we prefer to employ platinum metal or an alloy of platinum-ruthenium.

A wide series of chromium-tungsten oxides are suitable for providing a support for a noble metal or an alloy of a noble metal to form a catalytic and gas adsorbing material for our electrode. Such a series includes a range of 0.1 to 1.65 $Cr_2O_3$ per $WO_x$, where $x$ is in a preferred range of 1.5 to 2.5. While some decease in activity is noted as the chromia content is increased, the superior corrosion resistance of the high-chromia oxides is quite advantageous. Thus, we prefer to employ a range of 0.8 to 1.0 $Cr_2O_3$ per $WO_x$.

The current collector which requires material of good electrical conductivity can be provided in various configurations such as screens, metal wires, punched metal plate, expanded metal plate, porous metal sheet, etc. A wide variety of materials can be employed including platinum, gold, tantalum, and various nonnoble metals coated with platinum or gold. Any suitable manner is used to bond the catalytic and gas adsorbing materials to the collector to form an electrode.

The binder may be any adhesive material that is not chemically attacked by the electrolyte or the reactant fluid of the cell in which the electrode is to be used. Various binders meeting this criteria are known to the art. Preferred binders are hydrophobic halocarbons, most preferably fluorocarbon binders, having a critical surface tension less than the surface tension of water. A preferred maximum critical surface tension is 32 dynes/cm. Critical surface tension is defined as the value of the liquid surface tension at which liquids spread on a given polymer surface. A full discussion of critical surface tension is provided at page 240, "Surface Chemistry Theory and Industrial Application" by Lloyd I. Osipow, Reinhold Publishing Corporation, New York, 1962.

Perfluorinated polymers such as polytetrafluoroethylene (PTFE) and polyhexafluoropropylene possess the highest degree of hydrophobicity and chemical stability of presently known binders and are accordingly preferred. "Teflon 30" is a trademarked name of a commercially available aqueous emulsion of polytetrafluoroethylene including a wetting agent and which is suitable as a binder for our electrode.

When we employ a chromium-tungsten oxide as the support material, the ratio of such a binder to the total weight of the electrode excluding any current collector and waterproofing film may be from 4 to 25% by weight. When a second support of carbon and boron is incorporated, the ratio of such a binder calculated in the above manner is from 4 to 25% by weight. When a second support of carbon is incorporated, the ratio of such a binder calculated in the above manner is from 15 to 30% by weight. Amount of binder will vary within and outside the above ranges with different sources of support material and methods of fabrication.

One general method for preparing a fuel cell electrode anode as shown in FIGS. 1 and 2 of the drawing is as follows: A precipitation method is employed to produce the chromium-tungsten oxide resulting in highly dispersed material. The hydroxide of chromium is precipitated from a solution of its chloride with ammonium hydroxide. This precipitate is wet-blended with tungstic acid, $H_2WO_4$, having a surface area of about 12/cm² per gram. After air drying at 150° C., the mass is reduced at 600 to 800° C. in flowing hydrogen for a period of 4 hours. Other reducing gas mixtures are also useable, such as carbon monoxide, hydrogen-steam and carbon monoxide-carbon dioxide. After cooling in argon, the material is ready for use.

A noble metal or an alloy of a noble metal is dispersed on a support of the above chromium-tungsten oxide. For example, a solution is prepared containing platinum "P" salt, $Pt(NH_3)_2(NO_2)_2$ in nitric acid and water. This solution is added to and mixed with the chromium-tungsten oxide powder to form a paste which is dried subsequently at 105° C. on a hot plate for 1 hour. An additional hour of drying is also employed by heating the paste at 150° C. in an oven. The resulting powder is a chromium-tungsten oxide with platinum dispersed thereon. The same procedure is followed when it is desired to disperse an alloy of a noble metal, such as platinum-ruthenium, on a chromium-tungsten oxide support. A suitable ruthenium salt, such as ruthenium nitrate, is added to the above-described solution. It is also preferred to avoid halogen containing salts. The same procedures are also followed to disperse the above meals on a carbon and boron or carbon support.

A paint is prepared in a dish with the metal dispersed on the chromium-tungsten oxide powder or with the metal dispersed on both the chromium-tungsten oxide powder and the carbon and boron or carbon powder in an aqueous suspension of polytetrafluoroethylene (PTFE). This paint is then applied onto a clean 45-mesh platinum screen with a brush until the paint is used completely. After each coating on the platinum screen, the coat is cured over a hot plate at 225° C. and then the electrode is allowed to cool before the next coat is applied. After the final paint coat has been applied, cured and cooled, an additional half-hour cure over the hot plate is employed followed by the spraying thereon of a PTFE film on one surface thereof. The electrode is then given a final 10 minute cure at 350° C. to sinter the PTFE and to decompose the platinum "P" salt further. If only the chromium-tungsten oxide support is incorporated, the electrode is additionally pressed at 350° C. for 10 minutes at a pressure of about 2000 lbs./sq. inch of electrode surface. A plurality of these electrodes are prepared.

An illustrative operation of the above electrodes comprises the employment of the above electrodes as anodes in fuel cells with a platinum black electrode bonded with PTFE, employed as the cathode. The cathode was prepared as follows: An aqueous suspension containing 59.6 percent by weight PTFE is diluted with 7 volumes of water. An aluminum foil is used as the casting surface on which is scribed the ultimately desired pattern of the electrodes. The aluminum foil is placed on a hot plate maintained at 120°–150° C. to facilitate evaporation of the water as the PTFE emulsion is sprayed onto it, using an air brush. The desired amount of spray per unit area is evenly distributed over the surface at a rate such that wet areas do not accumulate and run. After the desired amount of emulsion has been sprayed onto the casting surface, it is heated at 350° C. to volatilize the emulsifying agent and to sinter the PTFE particles into a coherent film. A mixture of platinum black and PTFE emulsion is then prepared and diluted with sufficient water to give a thin slurry, which can be conveniently spread over the PTFE film on the casting surface to cover the scribed area showing the pattern of the desired electrode. When a uniform coating is achieved, the water is slowly evaporated from the emulsion on a hot plate whose bed temperature is slowly increased to a final value of 250°–350° C. to dispel the emulsifying agent.

To incorporate the current collector in the electrode, a similar procedure is used to form a second PTFE platinum black powder directly on another casting surface without an underlying PTFE film. The current collector, a 45-mesh platinum screen, is cut to the desired shape and is centered over the electrode pattern on one of the two casting surfaces and the other casting surface is then centered on top of the current collector. This assembly is pressed at 350° C. for 10 minutes at a pressure of about 2000 lbs./sq. inch of electrode surface. Following pressing, the aluminum foil casting surfaces are dissolved from the electrodes in 20% aqueous sodium hydroxide and the electrode structures are rinsed with water and dried. By this technique, cathode electrodes are produced in which the current collector is sintered in the PTFE-platinum black and the electrode is coated on one side with a pure film of PTFE, to be placed facing the gaseous fuel in the cell. The electrode has a platinum loading of 34 mg./cm.².

Each cell was operated with oxygen gas supplied to the cathode and fuel containing carbon monoxide supplied to the anode. The hydrophobic film surfaces of the anode and the cathode faced the fuel gas stream and the oxygen gas stream, respectively. A 5 normal sulfuric acid solution was used as the electrolyte and the cell was operated at a temperature of 85° C. This cell operated quite satisfactorily with the fuel containing carbon monoxide and its operation will be discussed further below in connection with the subsequent figures of the drawing.

Examples of fuel cell electrodes and fuel cells employing such electrodes made in accordance with our invention are set forth below:

EXAMPLES 1–5

The details as to the composition of five fuel cell electrodes are set forth below. Example 1 was made in accordance with the above description for the cathode containing platinum black and bonded by PTFE.

Examples 2–5 were made in accordance with our invention as set forth above and as shown in FIGS. 1 and 2 of the drawing.

Each of the electrodes had a PTFE film of 1.6 milligrams per square centimeter on one surface which was on the gas side when the electrode was employed in a fuel cell.

TABLE I

| Example No. | Wt. of noble metal, mg./cm.² | Form of noble metal | Combined wt. of noble metal and support, mg./cm.² | Wt. of PTFE binder, mg./cm.² |
|---|---|---|---|---|
| 1 | 34 | Platinum black | 34 | 3 |
| 2 | 6.7 | 16.7 wt. percent (Pt-75% Ru) on $Cr_2O_3 \cdot WO_x$ | 40 | 3 |
| 3 | 5.9 | 16.7 wt. percent Pt on $Cr_2O_3 \cdot WO_x$ | 35 | 3 |
| 4 | 6.3 | 16.7 wt. percent (Pt-50% Ru) on $Cr_2O_3 \cdot WO_x$ | 38 | 3 |
| 5 | 6.2 | 16.7 wt. percent (Pt-30% Ru) on $Cr_2O_3 \cdot WO_x$ | 37 | 3 |

EXAMPLES 6–10

Each of the electrodes from examples 1–5 was employed as the anode in a fuel cell with an electrolyte of 5 normal $H_2SO_4$, and a cathode of platinum bonded with PTFE onto a current collector made in the same manner as the electrode of example 1. Each cathode had a platinum loading of 34 mg./cm.². A hydrophobic film of 1.6 milligrams of PTFE per square centimeter was provided on the gas side of each cathode and each anode and a fuel gas with a composition of 78% $H_2$, 2.0% CO, 20% $CO_2$ and 0.25% $CH_4$ was supplied to the anode. Oxygen was supplied to the cathode. The cell was operated at 85° C.

Figure 3:
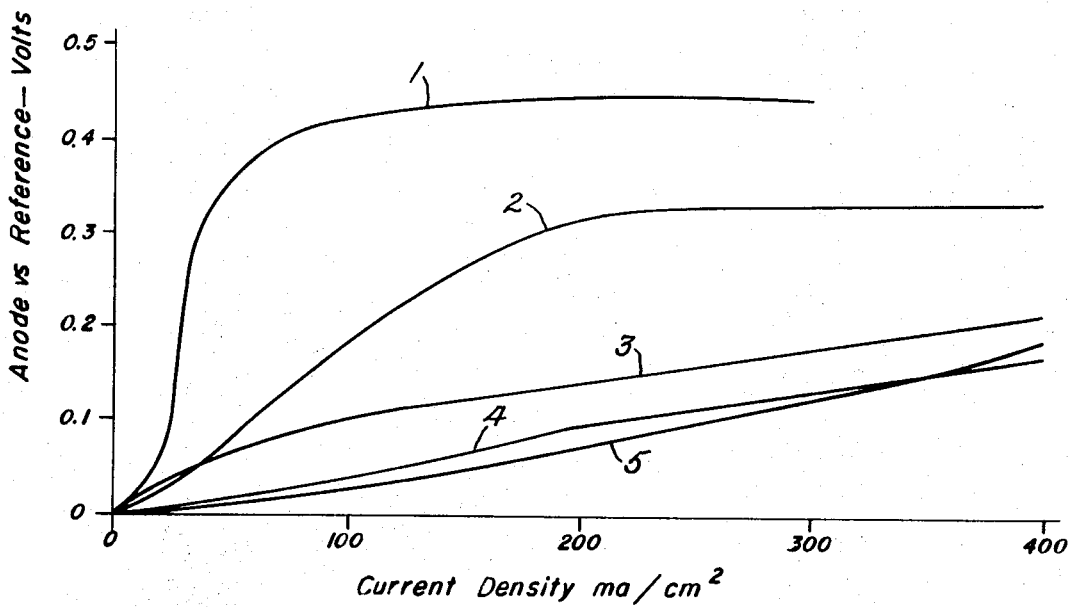
FIG. 3 is a plot showing the performance in a fuel cell with a fuel containing carbon monoxide of various fuel cell electrodes embodying our invention.

The effect of our electrode as set forth above in examples 2-5 are compared with the electrode set forth in example 1 which contained only platinum. This comparison is shown in FIG. 3 of the drawing wherein the current density in milliamperes per square centimeter is plotted against anode versus reference in volts. These curves represent anode polarization as a function of current density. The lower values therefor represent better performance and lead to higher voltages between terminals of complete fuel cells. Curves 1-5 show the performance of the five fuel cells as described above which employed anode electrodes 1-5, respectively, from examples 1-5. FIG. 3 demonstrates clearly the superior performance of the anode electrodes of our invention over the performance of the anode containing only platinum.

EXAMPLES 11-17

The details as to the composition of seven fuel cell electrodes are set forth below. Example 11 was made in accordance with the above description for the cathode containing platinum black and bonded by PTFE. Examples 12-17 were made in accordance with our invention as set forth above and as shown in FIGS. 1 and 2 of the drawing.

Each of the electrodes had a PTFE film of 1.6 milligrams per square centimeter on one surface which was on the gas side when the electrode was employed in a fuel cell.

TABLE II

| Example No. | Wt. of noble metal, mg./cm.$^2$ | Form of noble metal | Combined wt. of noble metal and support, mg./cm.$^2$ | Wt. of PTFE binder, mg./cm.$^2$ |
| --- | --- | --- | --- | --- |
| 11 | 34 | Platinum black | 34 | 3.0 |
| 12 | 4.8 | 16.7 wt. percent Pt on supports* | 28 | 2.5 |
| 13 | 4.8 | 16.7 wt. percent (Pt 30% Ru) on supports.* | 29 | 2.5 |
| 14 | 3.0 | 12.0 wt. percent (Pt 30% Ru) on supports.* | 25 | 2.2 |
| 15 | 2.0 | 8.4 wt. percent (Pt 30% Ru) on supports.* | 24 | 2.1 |
| 16 | 1.5 | 6.0 wt. percent (Pt 30% Ru) on supports.* | 24 | 2.1 |
| 17 | 1.1 | 4.2 wt. percent (Pt 30% Ru) on supports.* | 25 | 2.2 |

*In Examples 12-17, the supports were chromium tungsten oxide, and a mixture of carbon with boron dissolved therein and boron carbide. In Examples 12-17, the chromium tungsten oxide, and the mixture of carbon with boron dissolved therein and boron carbide served to support the indicated noble metal at the same weight percent level. Equal amounts of each supported material were used in preparing an electrode.

EXAMPLES 18-24

Each of the electrodes from examples 11-17 was employed as the anode in a fuel cell with an electrolyte of 5 normal $H_2SO_4$, and a cathode of platinum bonded with PTFE onto a current collector made in the same manner as the electrode of example 11. Each cathode had a platinum loading of 34 mg./cm.$^2$. A hydrophobic film of 1.6 milligrams of PTFE per square centimeter was provided on the gas side of each cathode and each anode and a fuel gas with a composition of 78% $H_2$, 2.0% CO, 20% $CO_2$ and 0.25% $CH_4$ was supplied to the anode. Oxygen was supplied to the cathode. The cell was operated at 85° C.

Figure 4:
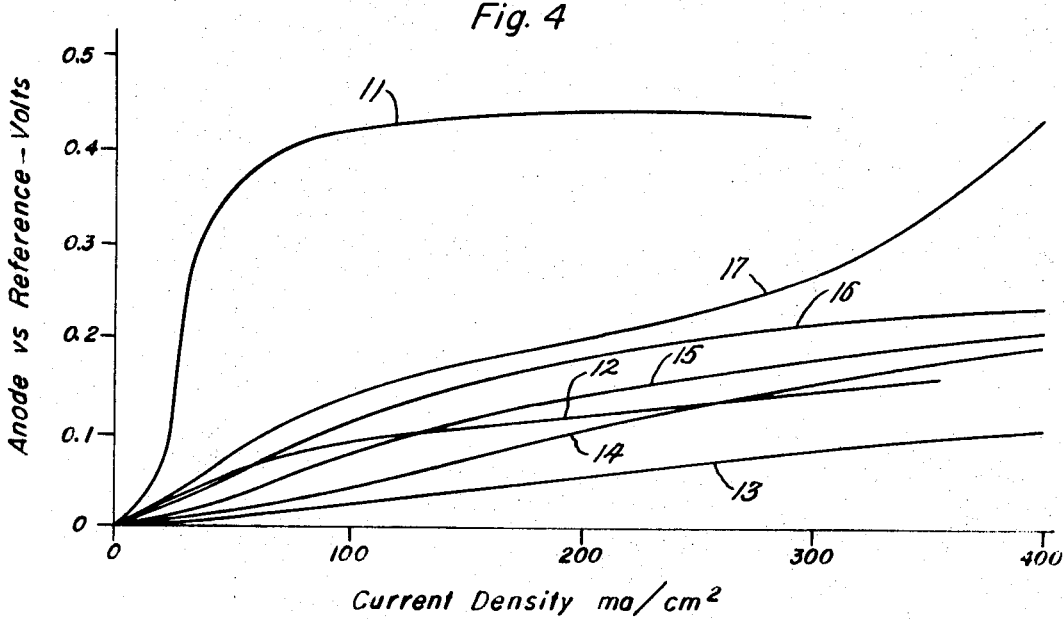
FIG. 4 is a plot showing the performance in a fuel cell with a fuel containing carbon monoxide of various fuel cell electrodes embodying our invention.

The effect of our electrode as set forth above in examples 12-17 are compared with the electrode set forth in example 11 which contained only platinum. This comparison is shown in FIG. 4 of the drawing wherein the current density in milliamperes per square centimeter is plotted against anode versus reference in volts. These curves represent anode polarization as a function of current density. The lower values therefor represent better performance and lead to higher voltages between terminals of complete fuel cells. Curve 11-17 show the performance of the seven fuel cells as described above which employed anode electrodes 11-17, respectively, from examples 11-17. FIG. 4 demonstrates clearly the superior performance of the anode electrodes of our invention over the performance of the anode containing only platinum.

While other modifications of the invention and variations thereof which may be employed within the scope of this invention have not been described, the invention is intended to include such as may be embraced within the following claims:

What we claim as new and desire to secure by Letters Patent of the United States is:

1. An electrode comprising catalytic and gas adsorbing materials, a current collector, and a binder bonding the materials together and to the current collector in electronically conductive relationship, said catalytic and gas adsorbing materials comprising a mixed oxide of chromium and tungsten as a support, and a metal dispersed on the support, the metal selected from the class consisting of noble metals and alloys of noble metals.

2. An electrode as in claim 1, wherein said materials comprise a mixed oxide of chromium and tungsten as a support and an additional support selected from the class consisting of carbon with dissolved boron therein, a mixture of carbon with boron dissolved therein and boron carbide, and carbon, and a metal dispersed on both of the supports, the metal selected from the class consisting of noble metals and alloys of noble metals.

3. An electrode as in claim 2, in which the carbon is in a graphitic state.

4. A fuel cell comprising a cathode electrode, an oxidant supply for the cathode electrode, an acid electrolyte, and a fuel containing carbon monoxide, and an anode electrode comprising catalytic and gas adsorbing materials, a current collector, a binder bonding the materials together and to the current collector in electronically conductive relationship, said catalytic and gas adsorbing materials comprising a mixed oxide of chromium and tungsten as a support, and a metal dispersed on the support, the metal selected from the class consisting of noble metals and alloys of noble metals.

5. A fuel cell as in claim 4, wherein said materials comprise a mixed oxide of chromium and tungsten as a support and an additional support selected from the class consisting of carbon with dissolved boron therein, a mixture of carbon with boron dissolved therein and boron carbide, and carbon, and a metal dispersed on both of the supports, the metal selected from the class consisting of noble metals and alloys of noble metals.

6. A fuel cell as in claim 4, in which the carbon is in a graphitic state.

* * * * *